April 29, 1930.  C. C. WINCHESTER  1,756,414

FUMIGATING DEVICE

Filed April 14, 1928

INVENTOR.
Carey Carter Winchester
BY
Ahrens, Crane & Gordon
ATTORNEYS.

Patented Apr. 29, 1930

1,756,414

UNITED STATES PATENT OFFICE

CAREY CARTER WINCHESTER, OF BROOKHAVEN, GEORGIA, ASSIGNOR TO NATIONAL CEDARCHEX CORPORATION, OF FULTON COUNTY, GEORGIA, A CORPORATION OF GEORGIA

FUMIGATING DEVICE

Application filed April 14, 1928. Serial No. 270,134.

Broadly this invention relates to dispensing devices, but it more especially comprehends a type adaptable for a disinfecting and fumigating process where volatile disinfectants are employed, and embodies improvements on the device forming the subject matter of my application, Ser. No. 186,747, filed April 26, 1927.

An important object of this invention is the provision of means for supporting the container of a fumigating substance embodying means having portions adapted to contact the bottom and top of the container, the portion engageable with the top of the container being preferably formed of an aromatic wood adapted to permit automatic discharge of the fumigating contents to the surrounding atmosphere.

Another important object is the provision of a container of bottle like configuration, and a tubular member insertable through the neck of the container extending within the container to a point slightly spaced from the bottom thereof, said tubular member having an aperture in its lower extremity, and means carried by the supporting means and adjustable through the bottom of the container to effect opening and closing of the aperture in said tube to control the discharge of the disinfecting substance within said container through said tube, and spring means for operatively securing the tube in the container and effecting locking of the container and tube to the supporting means.

A further object of the invention is the provision of a device of this character, including a container for a fumigating substance and a mixing or vapor chamber within said container and means for controlling and regulating the flow of the fumigating substance from the container to the said chamber.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Figure 1:
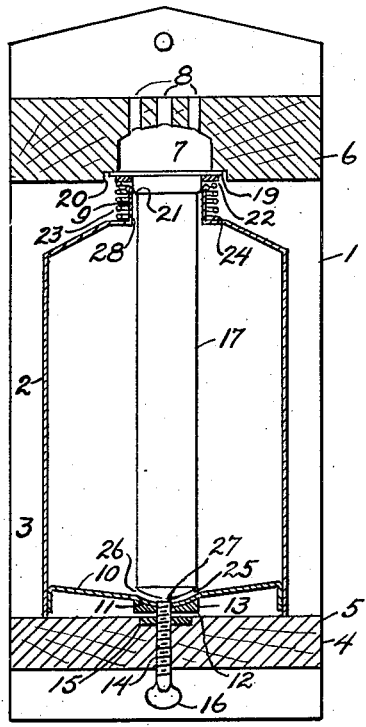
Fig. 1 is a vertical sectional view of my improved disinfecting device.
Figure 2:
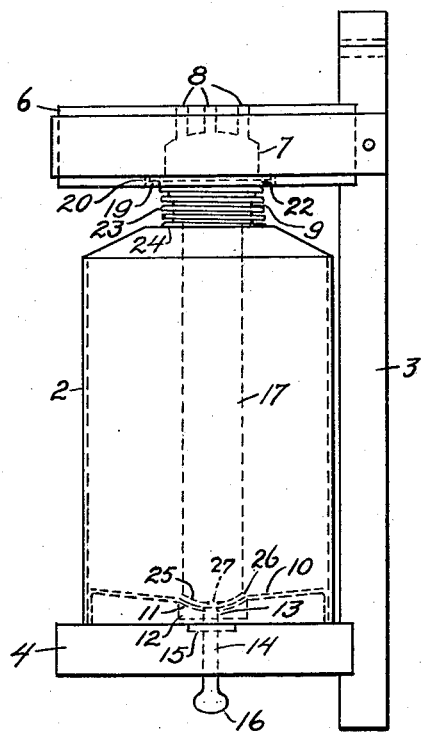
Fig. 2 is a side elevation of the device.
Figure 3:
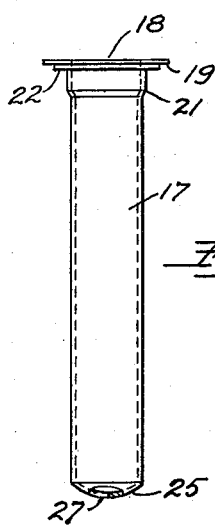
Fig. 3 is an elevational view of the tube removed from the container.

While the principles of the device forming the subject matter of my application No. 186,747 have been proven correct, practice has demonstrated the necessity for certain improvements in connection with the manufacture of the device, and the necessity of expeditiously controlling the discharge of the contents from the container, and it was to overcome such deficiencies and to eliminate certain parts by providing a device for supporting a container comprising lateral extensions between which is adapted to be positioned a container, one of said extensions additionally constituting a perforated closure and the other carrying an adjustable means for controlling the discharge of the contents of the container, the said container provided with means for permitting the discharge of a predetermined amount of the contents of the container, that I designed the device forming the subject matter of this invention.

In the illustrated embodiment characterizing this invention there is shown a holder 1, adapted to support a container 2. Holder 1 is preferably constructed of cedar or similar aromatic wood adapted to blend with the fumigating substance and comprises an upright base member 3 having a laterally extending container supporting member 4, suitably secured to the base member 3 at a point spaced from its lower end, as at 5, and a laterally extending member 6 corresponding in configuration to the member 4 and in spaced parallelism therewith. The member 6 is formed with a central hollowed out portion 7 in its under surface, and having a plurality of apertures 8 extending from said hollowed out portion to the upper surface of said member, which is for a purpose hereinafter appearing.

The container 2 adapted to seat on and be supported by member 4 is formed with a neck 9 and having its bottom 10 sloping circumferentially towards a central depression or well 11, and a thickened block portion 12 formed on the under surface of bottom 10 immediately below the depression 11, formed with a threaded opening 13 adapted to received a correspondingly threaded adjusting screw 14, extending through the member 4 and threadedly mounted in the anchor plate 15, suitably imbedded in the member 4 with its upper end extending through bottom 10, said screw 14 terminating at its lower end in wing head 16, by means of which its adjustment is effected, as is well understood.

A tube 17 having its upper end open as at 18, provided with a lateral flange 19 adapted, when the tube is inserted in the container 2, to seat in the countersunk portion 20 of the member 6, and having an enlarged annular shoulder 21 adapted to snugly fit within the neck 9 of the container, and a cork or other suitable washer 22 is mounted on said tube and seats against the flange 19. An extension spring 23 is adapted to be mounted on the neck 9 of the container 2 and the tube 17 when the latter is operatively positioned, said spring seating on the container as at 24, and against the washer 22, thereby tending to firmly seat the container on the member 4, and the flange 20 of tube 17 against member 6, and maintain the bottom 25, corresponding in configuration to the depression 11, slightly elevated from the latter to provide an annular channel 26. The said bottom 25 is apertured as at 27, and the flow of the contents of the container through said channel and aperture 27 is controlled by the adjustable screw valve 14 operable to open and close said aperture 27, as is apparent without further explanation.

The container 2 is adapted to be filled with a fumigating substance through opening 28, and closed by threaded plug or other suitable closure means, the screw valve 14 being adjusted to permit the desired flow of liquid from the container 2 into evaporation tube 17. It will thus be seen that by this adjustment the desired rate of flow into the tube 17 is effected, and by means of which a more complete volatilization is effected by reason of the thorough impregnation of the air within the tube with the disinfecting substance, and the further action of the aromatic wood thereon as it passes through apertures 8 for dispersion into the surrounding atmosphere.

The operation of the device would seem to be clear from the above description, but it might be well to further state, when it is desired to fumigate a chest, closet, room, or the like, the device may be hung in a perpendicular position, and when the container is filled with a disinfecting substance the rate of flow of the substance into the tube is controlled by the screw valve 14, for impregnating the air in the tube with the substance and the volatile mixture then discharged through apertures 8 for dispersion to the surrounding atmosphere.

The said hollowed out portion 7 may be packed with a suitable absorbent such as cotton or the like, to further control the vaporization of the substance.

It will thus be seen that the contents of the container may continuously flow into mixing chamber 17, the volatilized particles passing upward through perforations 8 for dispersion to the surrounding atmosphere, the extent of the flow being regulated by valve 14. However, dependent upon the exigencies of the particular situation, it might be desirable to permit only a given amount of the substance to be discharged to the surrounding atmosphere, and in which event any predetermined amount of the substance may be permitted to enter the evaporization or mixing chamber 17, and preventing any further flow by closing the valve 14, as will be clear without further description.

Although in practice I have found that the form of my invention illustrated in the accompanying drawings and referred to in the above description, as the preferred embodiment, is the most efficient and practical; yet realizing the conditions concurrent with the adoption of my invention will necessarily vary, I desire to emphasize that various minor changes in details of construction, proportion and arrangement of parts, may be resorted to within the scope of the appended claims without departing from or sacrificing any of the principles of this invention.

Having thus described my invention, what I desire protected by Letters Patent is as set forth in the following claims:

1. A disinfecting device including a holder, having spaced lateral projections, a container for a disinfecting substance adapted to be inserted between and supported by said projections, a tube constituting a chamber adjustably inserted within the container open at its upper end and having an aperture in its lower end, establishing communication with said container, spring means engageable with said tube and container to maintain the tube and container in operative position with respect to the projections, and means carried by the holder to adjustably engage the perforation in said tube to control the flow of the fumigating substance from the container into said tube.

2. A container for a fumigating substance, having its bottom formed with a centrally disposed well, a tubular-like chamber insertable in said receptacle with its lower end conforming in configuration to said well and in spaced relation therewith to provide an annular channel, a perforation in the lower end of said tube establishing communication with said channel, and means carried by the container and operable to interrupt communication between the tube and container.

3. A disinfecting device including a holder, having lateral spaced projections, a receptacle for a disinfecting substance comprising a tubular chamber telescopically insertable within said container, the bottom of said tube being in communication with said container, means for controlling the flow of the fumigating substance from the container into the tubular chamber, and means coacting with the container and tube to telescopically extend the tube and container to effect engagement of the tube with the upper extension, and the receptacle with the lower extension to maintain the same in operative position, the upper end of the tube being in communication with the surrounding atmosphere.

CAREY CARTER WINCHESTER.